UNITED STATES PATENT OFFICE.

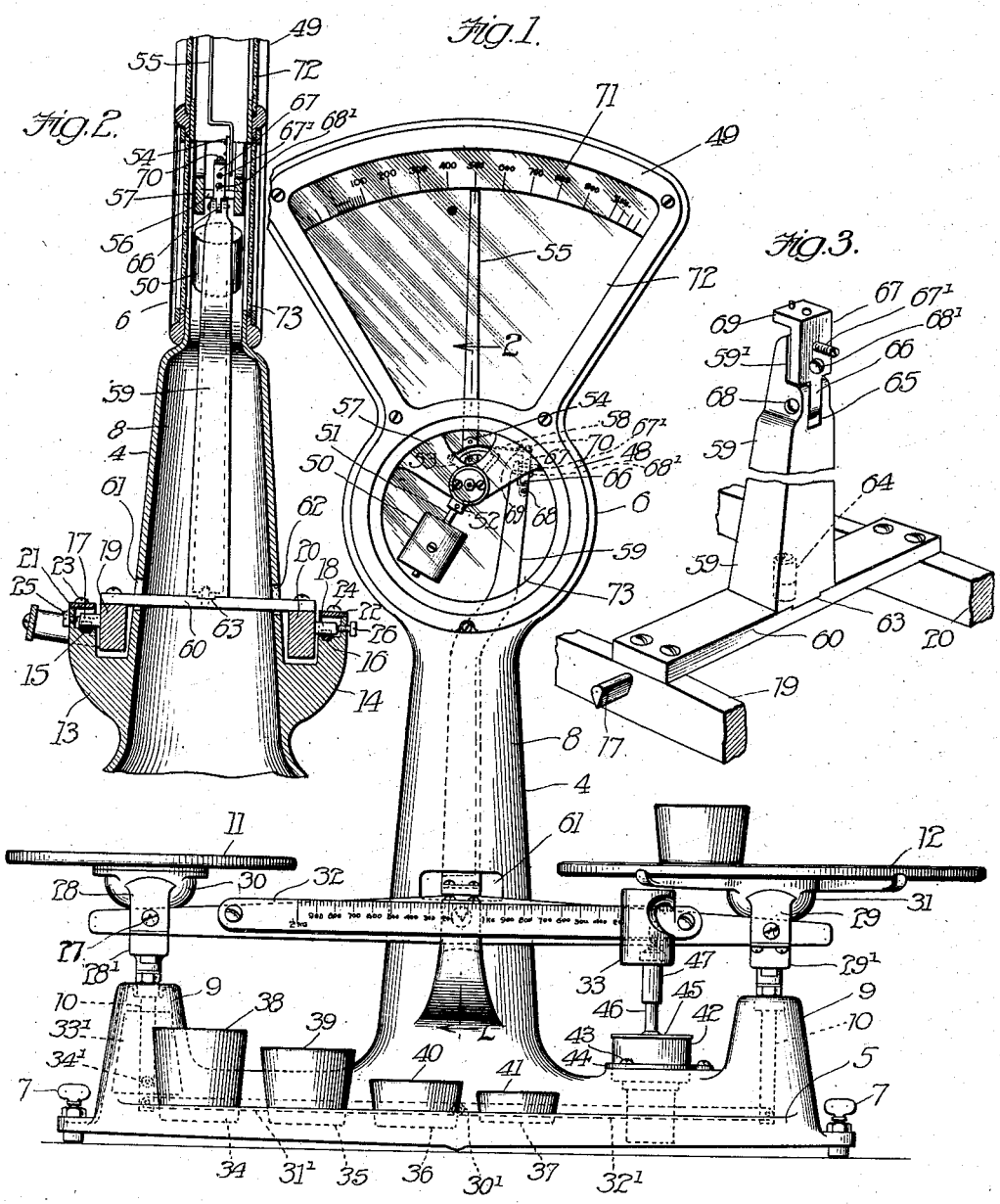

LEWIS CALVIN WETZEL, OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

SCALE.

1,213,318.  Specification of Letters Patent.  Patented Jan. 23, 1917.

Application filed March 28, 1912.  Serial No. 686,827.

*To all whom it may concern:*

Be it known that I, LEWIS C. WETZEL, a citizen of the United States, residing at Toledo, in the county of Lucas and State of Ohio, have invented certain new and useful Improvements in Scales, of which the following is a specification.

My invention relates more particularly to so-called even balance scales, the characteristic feature of which is a beam or lever pivoted at the center of its length and carrying at opposite ends pans or platforms for the commodity to be weighed and counterweights respectively. In the use of this kind of device it is customary to place the commodity upon one pan and add known weights to the other pan until the commodity is slightly overbalanced. Such a scale has also been provided with a pointer attached to the beam at its pivotal point, which pointer vibrates over and co-acts with an arc-shaped scale to indicate the excess in the weights of the commodity over the last unit of weight added. The objection to this class of scale as heretofore built is that the range of weight which can be taken care of by the pointer is necessarily extremely limited depending upon the vertical distances between the center of gravity and point of suspension of the beam which for accurate weighing must be brought close together and as a result the counterbalance weights added by hand must necessarily closely approximate the full weight of the commodity, requiring a considerable handling of small weights.

My invention relates to scales of this character in which an even balance scale is provided with an index to indicate fractions of the weights which are added to the pan by hand, and its object is more particularly to dispense with the careful and minute adjustment of the scale by the addition of hand weights by increasing the scope or capacity of the index and chart.

With this and other objects which will appear hereinafter in view, my invention consists in the improvements set forth in the following claims and embodied in a specific form in the device illustrated in the accompanying drawings and specifically described in the following specification. But it is to be understood that my invention is not limited to the specific structure disclosed nor to any particular features thereof except in so far as they may be set forth in the claims.

In the accompanying drawings Figure 1 is a front elevation of my scale; Fig. 2 is a fragmentary vertical section on the line 2—2 of Fig. 1 and Fig. 3 illustrates in perspective a detail of the invention to be hereinafter referred to.

The frame of the scale consists in a casting 4 which includes the base section 5 and the housing 6, which latter is adapted to contain the automatic weighing mechanism. The base 5 may be adjusted by thumb screws 7, 7 to level the scale and carries in addition to the hollow column 8 which supports the automatic counterbalance mechanism and chart, hollow vertical bosses 9, 9 which project upwardly therefrom and receive the stems 10, 10 (see dotted lines) connected to the scale pans 11, 12. Upon opposite sides of the hollow column, or more properly speaking, to the front and rear thereof, are formed integral ears 13, 14 in the upper ends of which are received the agates 15, 16 upon which rest the knives 17, 18 of the beam. The latter is formed preferably of a casting, with two longitudinal members 19, 20 extending to the front and rear respectively of the hollow post 8 and connected at their ends into one rigid, preferably integral structure, and these members 19 and 20 carry the knives 17 and 18 respectively. If desired the cavities in the ears 13 and 14 which receive the knife edges may be provided with covers 21, 22 secured in place by screws 23, 24 and the correct transverse position of the beam is secured by means of adjusting screws 25, 26 threaded through the walls of the cavities in the ends of the ears. This particular construction of bearing forms no part of the present invention and is described only for the sake of completeness.

Upon opposite sides of the ends of the beam are upwardly directed knife edges 27 (indicated in dotted lines at the left of Fig. 1), upon which rest agates mounted in the depending legs 28, 29, formed integral with the castings 30, 31 which support the weight and commodity receptacles respectively. The legs 28, 29 extend downwardly upon opposite sides of the scale beam and are connected by yoke sections 28′, 29′ to which the stems 10, 10 above referred to are connected, and the latter which are thus made rigid with the scale pans or supports, are extended downwardly through the bosses 9, 9 into the interior of the base casting (as shown in dotted lines in Fig. 1) and are connected at their lower ends to a stationary stud 30′ upon the casting by means of links 31′, 32′. Upon the stem 10 is mounted a counterweight 33′ which may be a shot cup for sealing the scale and is secured on the stem by a nut 34′ and serves more particularly to offset the weight of the tare poise 33 hereinafter mentioned. A tare beam 32 is secured to the main beam parallel therewith and is suitably graduated and provided with the tare poise 33 to be used in a manner which will be readily understood. The base is further formed with a row of sockets 34, 35, 36, 37, adapted for the reception of a corresponding series of weights 38, 39, 40, 41, and with an opening through which extends the dash-pot 42 secured to the base by screws 43 passing through a flange 44 on the dash-pot and tapped into the base. The cover 45 of the dash-pot is provided with an upwardly extending cylinder 46 which is surrounded by a sleeve 47 secured to the piston rod, and the latter is pivoted to the beam, the purpose of the dash-pot being the usual one, to-wit, that of preventing violent motion of the beam and bringing the same rapidly to rest. The hollow column 8 merges at its upper end into a flat cylindrical chamber 48 which in turn expands into a flat fan-shaped chamber 49, which chambers contain an automatic counterbalance mechanism and chart and index finger respectively. The counterbalance mechanism consists of a pendulum having a weight 50 adjustable upon a rod 51 which latter is secured in a boss 52 upon a casting which comprises a segment 53 and an ear 54 to which the hand 55 of the indicator is riveted.

The casting above mentioned is mounted upon knives 56, which are suitably supported or seated upon brackets or webs 57 secured to or forming part of the main casting. Upon the segment at one end thereof is fastened a tape or strap 58, which is secured at its other end to an arm 59 rigidly attached to the beam at the middle thereof.

The construction of the arm and its means of attachment to the beam and ribbon respectively are shown in perspective in Fig. 3. A reference to that view and to Fig. 2 shows a cross piece 60 secured at its opposite ends to the members 19 and 20 of the beam and extending through openings 61, 62 formed in the hollow column for this purpose. The arm 59 before mentioned is connected to the cross piece by a mortise and tenon joint 63 and a dowel 64 and at its upper end is bifurcated or mortised as at 65 for the reception of an ear 66 on an angle piece 67, the ear being perforated to receive a pintle 68 upon which the angle piece 67 is pivoted. The upper end of the arm 59 is cut away as at 59′ to receive and form a bearing face for the angle piece 67, and the latter is angularly adjustable with reference to the arm by means of two screws, one of which, 67′, is tapped into the angle piece and presses against the face on the upper end of the arm 59 and the other of which, 68′, extends loosely through the angle piece 67 and is tapped into the upper end of the arm. By adjusting these screws in an obvious manner the angle piece 67 may be adjusted and rigidly held, and the effective length of the tape 58 attached thereto, as hereinafter described, increased or diminished.

An end of the tape or strap 58 is secured to the angle piece 67 on the upper face 69 thereof by means of a cap plate 70 and screws extending therethrough and tapped into the end portion of the angle piece 67 and the segment 53 referred to above, to which the other end of the ribbon is secured, and with which it coöperates, is not perfectly circular but is eccentric to correct for the varying movements of the pendulum for equal increments of weight. The chart 71 over which the indicator hand 55 moves is preferably divided and numbered to indicate suitable fractions of the smallest weight unit which it is intended to use upon the weight pan, and the fan-shaped chart casing and the chamber which incloses the automatic counterbalancing mechanism are provided with glass panels or windows 72, 73 on their opposite sides.

The operation of my scale will now be readily understood. When a commodity or article is to be weighed it is placed upon the scale pan at the right of Fig. 1 and if it weighs less than the capacity of the chart 71 its weight will be immediately indicated. If, however, its weight exceeds the capacity of the chart, hand weights or poises 38, 39, etc., are to be added to the pan 11 until the indicator hand returns from its extreme displaced position. The weight of the article will then be equal to the sum of the weights on the weight pan 11 plus the fraction indicated by the chart. If the commodity to be weighed is contained in a receptacle, tare may be weighed in the usual manner by the tare poise and beam.

It will now be evident that in my scale the indicator hand and chart is not limited in its capacity by the stability factor of the beam but may be determined at the pleasure of the designer or by the purpose for which it is intended, within wide limits, depending as it does upon the proportion of parts and the weight of the pendulum, but preferably, as heretofore stated, the entire capacity of the chart is made to equal the smallest unit of hand weight employed and the latter is determined purely by convenience in use and may be of any desired size. Many changes may be made in the scale above specifically described; thus the central elevated location of the automatic counterbalance and chart are obviously unessential to my invention in its broader aspect and other modifications not necessary to here suggest or enumerate come within the scope of my invention as set forth below.

I claim:

1. In a weighing scale, a beam, a commodity receptacle thereon, an indicating chart, a pendulum adapted to offset load on the scale pan to the capacity of the chart, an index hand carried by the pendulum and coöperating with the chart, an arm rigid with the beam and substantially perpendicular thereto, and an operative connection between the upper end of the arm and the pendulum.

2. In a weighing scale, a beam, a commodity receptacle thereon, an indicating chart, a pendulum suspended above the beam adapted to offset load on the scale pan to the capacity of the chart, an index hand carried by the pendulum and coöperating with the chart, an arm rigid with the beam and substantially perpendicular thereto, and an operative connection between the upper end of the arm and the pendulum.

3. In a weighing scale, a base, a hollow column rising from the base, a frame constituting a beam or lever comprising longitudinal members extending on opposite sides of the column, a cross piece connecting the opposite members of the frame and extending through the column, an upright arm mounted on the cross piece, a pendulum suspended from the hollow column, and connections between the upper end of the arm and the pendulum.

4. In a weighing scale, a beam, a commodity receptacle thereon, an indicating chart, a pendulum hung above the beam adapted to offset load on the scale pan to the capacity of the chart, an index hand carried by the pendulum and coöperating with the chart, an arm rigid with the beam and substantially perpendicular thereto, and an adjustable operating connection between the upper end of the arm and the pendulum.

5. In a weighing scale, a beam, a commodity receptacle thereon, an indicating chart, a pendulum hung above the beam adapted to offset load on the scale pan to the capacity of the chart, an index hand carried by the pendulum and coöperating with the chart, an arm rigid with the beam and substantially perpendicular thereto, a member pivoted to the upper end of the beam and adjustable with relation thereto, a segment secured to the pendulum, and a tape connected to the segment and pivoted member at its opposite end.

6. In a weighing scale, a beam, a commodity receptacle thereon, a pendulum hung above the beam, a segment rigid with the pendulum, an arm rigid with the beam and substantially perpendicular thereto, an angle piece pivoted to the upper end of the arm, adjusting screws for adjusting the angle piece with reference to the arm, and a tape connecting the angle piece and the segment.

7. In a weighing scale, a beam, weight and commodity receptacles at the opposite ends thereof, an arm rigid with the beam and extending substantially perpendicular thereto, a pendulum pivoted adjacent the upper end of the arm and substantially horizontal connections between the pendulum and upper end of the arm.

8. In a weighing scale, a beam, weight and commodity receptacles at the opposite ends thereof, an arm extending perpendicularly upward from the beam, a pendulum suspended near the upper end of the arm, a segment rigid with the pendulum, and a substantially horizontal tape connecting the segment and the upper end of the arm.

9. In a weighing scale, a beam having weight and commodity receptacles at the opposite ends thereof, an arm rigid with the beam and extending upward therefrom, a pendulum suspended near the upper end of the arm, an adjustable member mounted on the upper end of the arm, and substantially horizontal connections between the member and the pendulum.

10. In a weighing scale, a base having a hollow column rising therefrom and supporting a swinging pendulum, a pivoted frame constituting a scale beam having a weight and a commodity receptacle at its respective opposite ends, the members of the frame extending on opposite sides of the hollow column, a cross piece rigid with the hollow frame and extending through the hollow column, an arm mounted on the cross piece and extending upwardly within the column, a pendulum pivoted near the upper end of the arm and supported by the column, and a connection between the pendulum and the arm.

11. In a weighing scale, the combination of a base 5, a hollow column 8 rising therefrom and supporting a counterbalance chamber 48 and a scale housing 49, a frame constituting an open beam pivoted in opposite sides of the column and supporting at its opposite ends a commodity receptacle and a weight receptacle respectively, a cross piece secured to the beam at its opposite ends and extending through the hollow column, an arm extending upwardly substantially perpendicular to the beam within the hollow column, a casting pivoted within the counterbalance chamber and supporting a pendulum and indicator hand and a segment, a tape connecting the upper end of the arm with the segment and a chart within the housing 49 over which the hand moves.

12. In a weighing scale, a beam, a commodity receptacle thereon, an indicating chart, a pendulum adapted to offset load on the scale pan to the capacity of the chart, an index hand carried by the pendulum and coöperating with the chart, an arm rising from the beam to a point near but to one side of the pivot of the pendulum, and an operative connection between the upper end of the arm and the pendulum.

13. In a weighing scale, a beam, a commodity receptacle thereon, an indicating chart, a pendulum adapted to offset load on the scale pan to the capacity of the chart, an index hand carried by the pendulum and coöperating with the chart, an arm rising from the beam to a point adjacent but to one side of the pivot of the pendulum, and a substantially horizontal connection between the pendulum and arm.

14. In a weighing scale, a beam, a commodity receptacle thereon, an indicating chart, a pendulum adapted to offset load on the scale pan to the capacity of the chart, an index hand carried by the pendulum and coöperating with the chart, an arm rising from the beam to a point above the pivot of the pendulum and to one side thereof, a segment rigidly connected to the pendulum, and a tape connecting the segment and arm.

15. In a weighing scale, a beam, a commodity receptacle thereon, an indicating chart, a pendulum hung above the beam and adapted to offset load upon the commodity receptacle to the capacity of the chart, an index hand carried by the pendulum and coöperating with the chart, an arm rigid with the beam and substantially perpendicular thereto, a member pivoted to the upper end of the arm and adjustable with relation thereto, a segment secured to the pendulum, the curved edge of which is substantially in the horizontal plane of the pivoted member, and a tape connected to the segment and pivoted member at its opposite ends.

LEWIS CALVIN WETZEL.

Witnesses:
   E. E. LONGENECKER,
   J. A. BURKHOLDER.